(12) United States Patent
Miebach et al.

(10) Patent No.: US 8,935,916 B2
(45) Date of Patent: Jan. 20, 2015

(54) PARTICULATE FILTER SYSTEM HAVING A VARIABLE DEGREE OF SEPARATION

(75) Inventors: Rolf Miebach, Bruehl (DE); Stephan Schraml, Koenigswinter (DE); Bernhard Hoffschmidt, Bergisch-Gladbach (DE); Daniel Gonsior, Aachen (DE); Fabian Holzheid, Gielde (DE)

(73) Assignee: Deutz Aktiengesellschaft, Cologne (DE)

( * ) Notice: Subject to any disclaimer, the term of this patent is extended or adjusted under 35 U.S.C. 154(b) by 652 days.

(21) Appl. No.: 13/139,392

(22) PCT Filed: Dec. 9, 2009

(86) PCT No.: PCT/EP2009/008774
§ 371 (c)(1),
(2), (4) Date: Aug. 5, 2011

(87) PCT Pub. No.: WO2010/066408
PCT Pub. Date: Jun. 17, 2010

(65) Prior Publication Data
US 2011/0283679 A1    Nov. 24, 2011

(30) Foreign Application Priority Data

Dec. 13, 2008  (DE) .................. 10 2008 062 217.6

(51) Int. Cl.
*F01N 3/00*  (2006.01)
*F01N 3/02*  (2006.01)
(Continued)

(52) U.S. Cl.
CPC ............... *F01N 3/021* (2013.01); *F01N 3/031* (2013.01); *F01N 2260/14* (2013.01); *F01N 2410/08* (2013.01); *Y02T 10/20* (2013.01)

USPC .................. 60/292; 60/287; 60/295; 60/297; 60/311; 60/324

(58) Field of Classification Search
USPC ............ 60/287, 288, 292, 297, 311, 324, 295
See application file for complete search history.

(56) References Cited

U.S. PATENT DOCUMENTS

| 5,019,142 A | 5/1991 | Waschkuttis .................. 55/429 |
| 6,989,045 B2 | 1/2006 | Bailey et al. |

(Continued)

FOREIGN PATENT DOCUMENTS

| DE | 103 43 045 A1 | 4/2005 |
| GB | 1 213 206 A | 11/1970 |

(Continued)

*Primary Examiner* — Thomas Denion
*Assistant Examiner* — Diem Tran
(74) *Attorney, Agent, or Firm* — Davidson, Davidson & Kappel, LLC

(57) ABSTRACT

A method for the operation of a particulate filter system for an internal combustion engine wherein an. An exhaust gas stream enters a housing via a gas inlet opening. The housing receives a particulate filter, the stream flows into crude gas ducts connected to the gas inlet opening, and the stream can flow out of the particulate filter via clean gas ducts that are in fluid connection with a gas outlet opening, and are separated from the crude gas ducts. The crude gas ducts are connected to a connecting space in the direction of flow, and the connecting space has an exhaust port controlled by a closing mechanism. According to the invention, a method for operating an open particulate filter system is provided, by which the degree of separation of the soot particles from the exhaust gas can be increased. This is achieved in that a partial exhaust gas stream of the exhaust gas stream can be discharged via the exhaust port into the environment, just as the primary exhaust gas flow can be discharged into the environment via the gas outlet opening, according at least to a particulate load thereof.

13 Claims, 1 Drawing Sheet

(51) Int. Cl.
   *F01N 1/00* (2006.01)
   *F01N 3/021* (2006.01)
   *F01N 3/031* (2006.01)

(56) References Cited

U.S. PATENT DOCUMENTS 7,503,170 B2 * 3/2009 Dubots et al. .................. 60/297

2007/0193257 A1 8/2007 Lindgens et al. ............... 60/297
2007/0277516 A1 12/2007 Dubots et al. .................. 60/313

FOREIGN PATENT DOCUMENTS

| GB | 1 213 506 A | 11/1970 |
| JP | 2004116322 | 4/2004 |
| JP | 2006233846 | 9/2006 |

\* cited by examiner

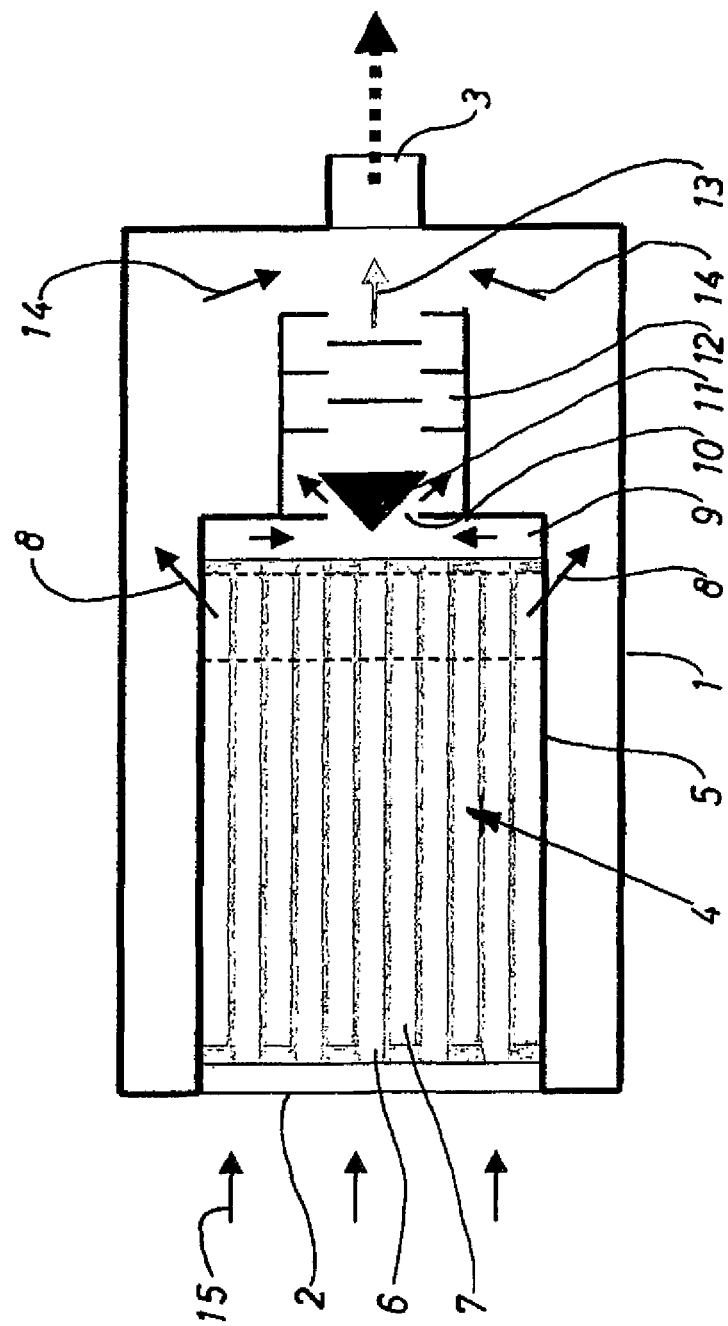

PARTICULATE FILTER SYSTEM HAVING A VARIABLE DEGREE OF SEPARATION

The invention relates to a method for the operation of a particulate filter system for an internal combustion engine, wherein an exhaust gas stream enters a housing via a gas inlet opening, wherein said housing receives a particulate filter, the stream flows into crude gas ducts connected to the gas inlet opening, and the stream can flow out of the particulate filter via clean gas ducts that are in fluid connection with a gas outlet opening and are separated from the crude gas ducts. The crude gas ducts are connected to a connecting space in the direction of flow, and the connecting space has an exhaust port controlled by a closing mechanism.

BACKGROUND

Such a particulate filter system is known from DE 103 43 045 A1. This particulate filter system has a particulate filter which is inserted in a housing, wherein the crude gas ducts are connected to a connection space which is designed as a collection chamber, at any point thereof seen from the perspective of the flow inlet side. In this collection chamber, the ashes are collected that were separated from the exhaust gas in the crude gas ducts and that cannot be burned in a regeneration process, and the same are disposed of. For this purpose, the collection chamber has a catching device, wherein a vacuum, for example, can be connected to the same for the purpose of extracting the ashes. This cleaning opening is separated from the gas outlet opening of the clean gas ducts, said gas outlet opening being designed as an outlet. To facilitate the transport of the ashes into the collection chamber, an opening can be allowed in the cleaning opening, said opening permitting a minimal flow. The exhaust gas flowing out through the opening can then be directed once again to the exhaust stream. The ashes are removed at larger intervals of time, for example as part of an inspection.

SUMMARY OF THE INVENTION

Other known methods likewise incorporate geometries wherein the unfiltered exhaust gas flows through crude gas chambers containing soot before flowing out of the system. However, there is no connection space in these methods which is connected to the crude gas spaces, such that each individual crude gas space must be provided with one or multiple bypass openings in order to allow a partial stream of the entire exhaust gas stream to pass unfiltered. In this way, the danger is increased that these openings (which are by necessity small) will become closed due to soot and/or ashes. In addition, there is no possibility of controlling the ratios of the filtered and unfiltered partial streams.

An object of the present invention is to provide a method for the operation of an open particulate filter system, by means of which the degree of separation of the soot particles from the exhaust gas can be increased.

The present invention provides a partial exhaust gas stream of the exhaust gas stream can be discharged via the exhaust port into the environment, just as the primary exhaust gas stream can be discharged into the environment via the gas outlet opening, according at least to a particulate load thereof. The particulate filter system in the present case is a so-called open system, wherein in principle a partial stream is always allowed to be discharged into the environment entirely uncleaned, according to legal regulations. Corresponding prior art methods and the associated configurations of the particulate filter system provide a bypass duct for this purpose (independent of whether the same is an external or an internal bypass duct), wherein a partial volume of an exhaust gas is diverted around the particulate filter via said bypass duct, and no interaction takes place between this partial stream and the particulate filter. In contrast, in the design according to the present invention, the entire exhaust gas stream is always directed through the soot and/or the crude gas ducts, the same bearing soot particles and/or having the same deposited thereon. This design enables a full interaction in the particle filter with agents that oxidize soot (for example $NO_2$). Depending on the soot load in the particulate filter, a partial exhaust gas stream can be discharged into the environment just as the primary exhaust gas stream is discharged into the environment.

However, in cases where the momentary particulate filter load admits, the method according to the invention moreover expressly enables (as depicted below) the complete halting of the partial exhaust gas stream. The method according to the invention significantly improves the function and/or the degree of efficiency of a particulate filter system substantially with respect to a method having a so-called bypass duct.

In another implementation of the invention the partial exhaust gas stream and the primary exhaust gas stream are discharged in a unified stream into the environment. In this case, the partial exhaust gas stream and the primary exhaust gas stream are preferably brought together in the housing. Consequently, the gases exiting from the exhaust port are brought together directly with the clean gases exiting from the clean gas ducts, and this stream of mixed gas exits the housing through the gas outlet opening.

In another implementation of the invention, the partial exhaust gas stream flowing out via the exhaust port is oriented opposite and facing the gas outlet opening, and/or the corresponding configuration thereof includes the orientation of the exhaust port on the side of the housing which faces the gas outlet opening. This design ensures, at least as far as is possible, that the partial gas streams have the same direction of flow and that no mutual, disadvantageous flow effects occur.

In a further implementation of the invention, the closing mechanism, the same being designed as a flow restrictor, can be adjusted during operation of the particulate filter system. This adjustment proceeds particularly according to the particulate filter load. Consequently, a method and/or a system is invented, wherein the optimum degree of separation is always achieved. The flow restrictor can be designed in any appropriate manner, and multiple flow restrictors can be provided.

In an advantageous further embodiment, the flow restrictor can be adjusted between a closed position and an open position, wherein said open position at least forms a turbulent flow in the exhaust port.

Thus, the closed position can be selected if the particulate filter can receive soot particles. The open position, the same at least allowing a turbulent flow, ensures that under no circumstances will the exhaust port and/or the flow gap become clogged with soot particles; that is, the same cannot be obstructed. As such, even in the event that the particulate filter cannot be regenerated for a comparatively long period of time, the design prevents damage to and/or destruction of the particulate filter.

For example, the flow restrictor can be designed as a cone-shaped stopper which produces a ring-shaped exhaust gap for exhaust from the connection space, said exhaust gap being larger or smaller according to the position thereof with respect to the exhaust port. The connection space can be designed as small as desired within the scope of the invention. The connection space can also be arranged at nearly any position along the direction of flow of the crude gas ducts, for example in the case where the crude gas ducts and clean gas ducts are arranged cross-wise. It is also possible to arrange the connection space outside of the center and/or outside of the center line in cases where the flow of a cylinder-shaped particulate filter is oriented radially to the middle of the circular outer periphery thereof. This configuration results in crude gas ducts having varying lengths according to the entrance point or the entrance plane thereof.

Thus, it is possible with the particulate filter system according to the invention to significantly restrict flow through, or entirely close, the exhaust port when conditions are favorable for $NO_2$ regeneration. When conditions are not favorable for $NO_2$ regeneration, in contrast, the exhaust port can be partially opened. In this way, an optimum "open filter system" is created. However, the scope of the invention also includes a configuration wherein the flow restrictor is always set to a position which at least forms a turbulent flow in the exhaust port. In this case as well, the method according to the invention and/or the corresponding embodiment has the advantages depicted above with respect to the known systems.

Ashes, that is, components emitted by the internal combustion engine which cannot be burned, can also be collected by means of the described method—however, possibly to a lesser degree.

Furthermore, the soot particles carried in the partial exhaust gas stream agglomerate to each other while flowing through the crude gas ducts. This results from the soot particles being deposited on top of each other and next to each other on the walls of the crude gas ducts (for example, as the result of a low speed of flow), and the agglomerates are then later released.

In a further implementation of the invention, the partial exhaust gas stream is fed into a separator after exiting the exhaust port, wherein said separator is preferably designed as a coarse separator. Accordingly, a separator is placed downstream from the exhaust port. This separator is preferably a coarse separator, by means of which at least a partial volume of soot particles and/or agglomerates (and ashes) are separated from the exhaust gas stream flowing through said coarse separator, and the same are removed during a regeneration, wherein said regeneration takes place coincident with the regeneration of the particulate filter, or take places independently thereof. In this implementation, the coarse separator is preferably an impactor or a cyclone.

BRIEF DESCRIPTION OF THE DRAWING

Additional advantageous embodiments of the invention are described below with reference to the illustrations, which depict an embodiment, wherein:

FIG. 1 shows an illustration of the principle of the design of the particulate filter system for carrying out the method.

DETAILED DESCRIPTION

The particulate filter system has a housing 1 which is particularly manufactured from a metallic material and which is inserted in a suitable manner into the exhaust gas system of an internal combustion engine. The cylinder-shaped housing 1 has a gas inlet opening 2 through which the exhaust gas stream 15 enters the system, and has a gas outlet opening 3, wherein both of the above are provided with a flange for the purpose of integrating the same into the exhaust duct. A particulate filter 4 is inserted into the housing 1, and the inlet side thereof is connected to the gas inlet opening 2. The particulate filter 4 can be arranged in its own particulate filter housing 5 which is in turn inserted into the housing 1, as illustrated in the figure, or the same can be directly integrated into the housing 1. The particulate filter 4 is designed as a so-called wall-flow filter, and is preferably manufactured from a ceramic material. The particulate filter 4 has crude gas ducts 6 and clean gas ducts 7 which are separated from each other by means of walls. The exhaust gas stream 15 flowing in through the gas inlet opening 2 into the crude gas ducts 6 flows through the crude gas ducts 6 and can penetrate through the walls into the clean gas ducts 7, separating out soot particles and ashes in the process; and a primary exhaust gas stream 14 leaves the same through an outlet 8 which is indicated by arrows. The crude gas ducts 6 and the clean gas ducts 7 can be arranged in any arrangement with respect to each other, for example as ducts which are parallel to each other, or also as ducts which are arranged at any angle to each other. In this case, the ducts themselves can have any shape and configuration. A special feature of this wall-flow filter is that the crude gas ducts 6 open into a connection space 9 in the direction of flow from the gas inlet opening 2 (wherein the connection space 9 lies opposite thereto in the illustration). However, the connection space 9 can also be arranged at another position in the particulate filter 4 depending on the embodiment thereof 4.

The connection space 9 has an exhaust port 10 which can be adjusted and closed by a closure in the form of a flow restrictor 11. A partial exhaust gas stream 13 flows through the exhaust port according to the position of the flow restrictor. A separator 11 which is particularly designed as a coarse separator is placed downstream from this exhaust port 10.

The partial exhaust gas stream 13 exiting from the separator 11 is brought together with the primary exhaust gas stream 14 exiting from the outlet 8 from the clean gas ducts 7, and the unified stream leaves the particulate filter system via the gas outlet opening 3.

REFERENCE NUMBERS

1 Housing
2 Gas inlet opening
3 Gas outlet opening
4 Particulate filter
5 Particulate filter housing
6 Crude gas duct
7 Clean gas duct
8 Outlet
9 Connection space
10 Exhaust port
11 Flow restrictor
12 Separator
13 Partial exhaust gas stream
14 Primary exhaust gas stream
15 Exhaust gas stream

What is claimed is:

1. A method for the operation of a particulate filter system for an internal combustion engine, an exhaust gas stream entering a housing, the housing receiving a particulate filter via a gas inlet opening, the exhaust gas stream flowing into a crude gas duct connected to the gas inlet opening, and flowing out of the particulate filter via clean gas ducts separated from the crude gas ducts, the clean gas ducts being in fluid connection with a gas outlet opening, the crude gas ducts being connected to a connection space in the direction of flow, and the connection space has an exhaust port controlled by a closing mechanism, the method comprising:

discharging a partial exhaust gas stream of the exhaust gas stream into the environment via the exhaust port according to a particulate load, as the primary exhaust gas stream is discharged via the gas outlet opening into the environment; and closing the exhaust port when conditions are favorable for regeneration of the particulate filter with a soot oxidizing agent.

2. The method as recited in claim 1 wherein the partial exhaust gas stream and the primary exhaust gas stream are discharged together into the environment.

3. The method as recited in claim 1 wherein soot particles carried in the partial exhaust gas stream agglomerate to each other while flowing through the crude gas ducts.

4. The method as recited in claim 1 wherein the soot oxidizing agent is $NO_2$.

5. The method as recited in claim 1 further comprising partially opening the exhaust port when conditions are not favorable for $NO_2$ regeneration.

6. The method as recited in claim 1 wherein the partial exhaust gas stream and the primary exhaust gas stream are brought together in the housing.

7. The method as recited in claim 6 wherein the partial exhaust gas stream flowing out via the exhaust port is oriented opposite to and facing the gas outlet opening.

8. The method as recited in claim 6 wherein the closing mechanism is designed as a flow restrictor adjustable during operation of the particulate filter system.

9. The method as recited in claim 8 wherein the flow restrictor is adjustable between a closed position and an open position, the open position at least forming a turbulent flow in the exhaust port.

10. The method as recited in claim 1 wherein the partial exhaust gas stream is directed into a separator after exiting the exhaust port.

11. The method as recited in claim 10 wherein the separator is a coarse separator.

12. A method for the operation of a particulate filter system for an internal combustion engine, an exhaust gas stream entering a housing, the housing receiving a particulate filter via a gas inlet opening, the exhaust gas stream flowing into a crude gas duct connected to the gas inlet opening, and flowing out of the particulate filter via clean gas ducts separated from the crude gas ducts, the clean gas ducts being in fluid connection with a gas outlet opening, the crude gas ducts being connected to a connection space in the direction of flow, and the connection space has an exhaust port controlled by a closing mechanism, the method comprising:

discharging a partial exhaust gas stream of the exhaust gas stream into the environment via the exhaust port according to a particulate load, as the primary exhaust gas stream is discharged via the gas outlet opening into the environment; and partially opening the exhaust port when conditions are not favorable for regeneration of the particulate filter with a soot oxidizing agent.

13. The method as recited in claim 12 wherein the soot oxidizing agent is $NO_2$.

\* \* \* \* \*